Oct. 12, 1948.　　　B. E. DEL MAR　　　2,451,280
CONTROL SYSTEM
Filed June 10, 1946
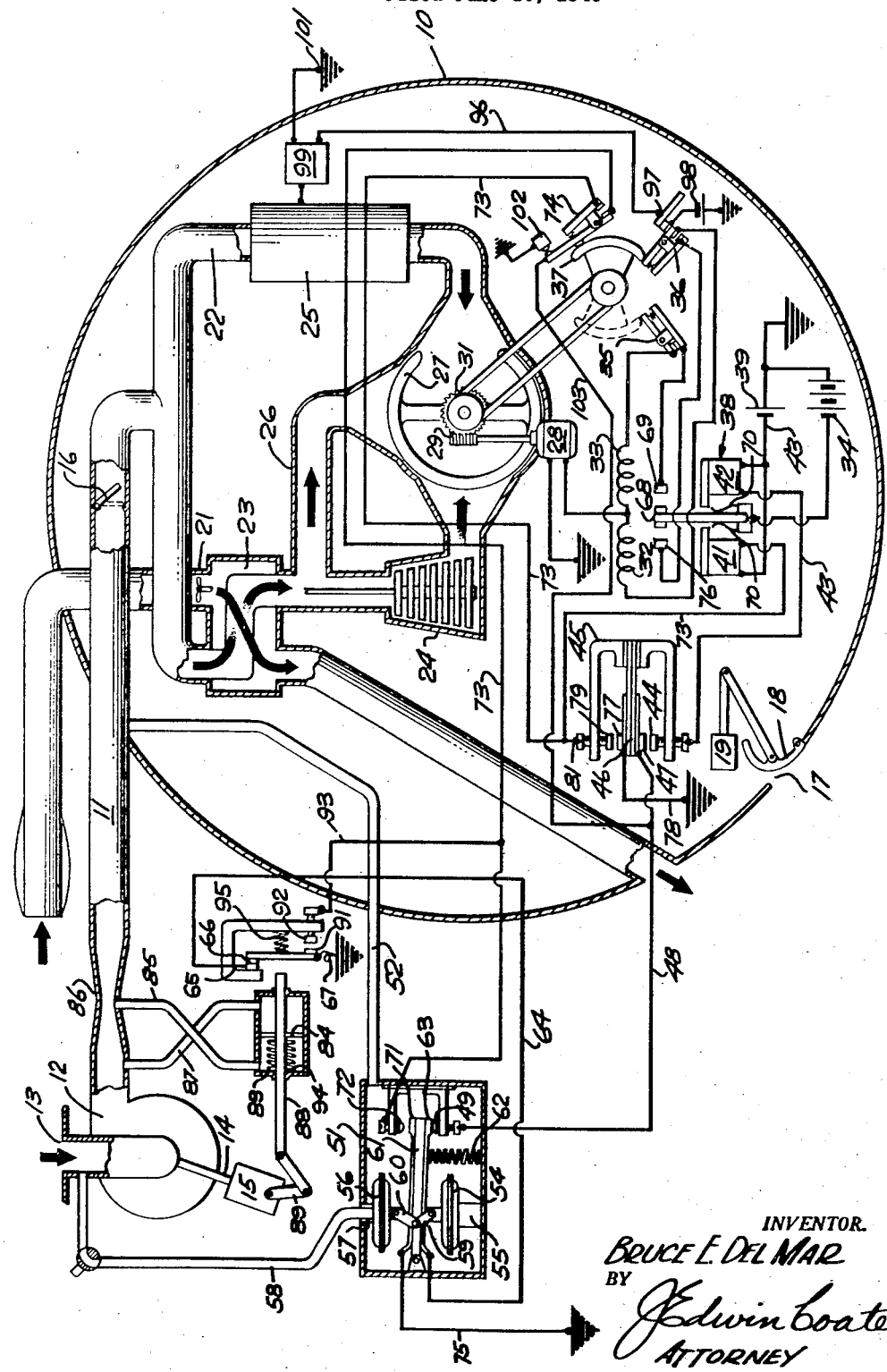
INVENTOR.
BRUCE E. DEL MAR
BY
Edwin Coates
ATTORNEY Patented Oct. 12, 1948

2,451,280

UNITED STATES PATENT OFFICE 2,451,280

CONTROL SYSTEM

Bruce E. Del Mar, Los Angeles, Calif., assignor to Douglas Aircraft Company, Inc., Santa Monica, Calif.

Application June 10, 1946, Serial No. 675,795

18 Claims. (Cl. 257—3)

This invention relates to a control system and more particularly to a system for controlling the pressure and temperature of the air within an aircraft cabin adapted to be pressurized.

It is well known that the pressure changes encountered in flight may cause considerable discomfort to passengers and that the low pressures encountered at higher altitudes necessarily limit the flight altitudes of aircraft not provided with pressurized cabins. As the air to be delivered to the cabin must be compressed to a relatively high degree at the maximum altitudes at which the aircraft is designed to be flown, the air delivering means have comprised superchargers of generally high load and speed capacity to produce the necessary pressure.

While intercooling of the heated compressed air has served to maintain comfortable cabin temperature in spite of the pressurization occurring during high altitude flights, it has been found that a more effective means of cooling the ventilation air delivered into the cabin is desirable and necessary during flights at low altitude and while standing or taxiing a passenger-carrying aircraft on the ground. This is particularly true where the ambient air is very warm as in the tropics or in temperate climates during hot summer weather.

To increase the passengers' comfort under such conditions, it is proposed to refrigerate or cool the cabin air to a temperature below that of the ambient atmosphere and thereby maintain the temperature of the cabin at a comfortable level. The air may be cooled by means conventional in the air conditioning industries, but to obviate the use of apparatus of considerable weight it is proposed to use an air exchange intercooler and an air cycle expansion turbine through which air from a supercharger is passed to reduce the temperature of the same before it is introduced into the cabin.

To meet peak refrigeration load requirements for the necessary cooling, a supercharger of approximately the same load capacity as is required to pressurize the cabin has been found to be desirable. Thus, to accomplish both functions, either two independent air superchargers or a single supercharger capable of delivering the summation of the refrigeration and pressurization loadings is required. Although such equipment produces not only the cabin pressurization required at high altitudes but also the reduction of the temperature of the cabin air as well, it is of considerable weight. In the case of a single supercharger to handle the total load requirement, a very large range of required drive speed is required.

To reduce the weight and complications of the equipment necessary to regulate the pressure and the temperature of the air within the cabin, I propose to use a supercharger of nominal load capacity for supplying air for pressurization and refrigeration and to incorporate into the cabin temperature control system load summation means for actuating a valve controlling the flow of air through the intercooler, the turbine, or a duct containing an air heating means whereby the peak load capacity of the supercharger may be used but not exceeded. As little, if any, refrigeration is necessary at altitudes requiring cabin pressurization, and as pressurization is generally not required at altitudes at which the ambient air may be so uncomfortably warm as to require a high degree of refrigeration, it is possible to combine the loadings from refrigeration and pressurization and still retain a relatively small supercharger with a reasonable power requirement.

Under certain conditions, however, the summations of the refrigeration and pressurization compression loadings may tend to exceed the power, speed, and stability limits of the supercharger so that it is necessary to incorporate a means for limiting the total loadings on the cabin supercharger. As the lack of pressurization causes more discomfort to passengers, it is proposed to devise the control system so that regulation of cabin pressure is independent of refrigeration control.

The means which control cabin temperature may consist of any temperature responsive means and, according to the present invention, it is this control on which the load limit is applied. Although any means desired can be used to effect the load limitation in the now preferred form of the present invention this means comprises a pressure responsive capsule mounted in a sealed case the interior of which is in communication with the duct pressure downstream from the supercharger while the interior of the capsule is exposed to the pressure at the supercharger inlet. The movable end of the capsule is pivotally connected to a movably mounted selecting means carrying a pair of contacts insulated from each other and movable between a pair of spaced contacts connected into separate control circuits. The selecting means is movable by changes in the differential pressure to which the capsule is subjected from positions intermediate said contacts to alternate positions in which one or the other of the contacts carried thereby is in engagement with one or the other of the spaced contacts. At low values of differential pressure across the supercharger an electrical circuit controlling the operation of the valve actuating means is established by engagement of the one contact carried by the selecting means and one of the spaced contacts. This circuit is energized by the temperature responsive device when the temperature of the air within the cabin reaches a predetermined maximum temperature to operate the valve actuating means to move the valve to a position in which air is directed through the turbine.

The temperature responsive device will control the position of the valve as long as the supercharger differential pressure is less than a predetermined limit. When the differential pressure exceeds this limit the selecting means is moved to break the circuit controlling the valve actuating means and the valve is thus held in its position at the time the predetermined differential pressure is reached.

As the aircraft ascends and ambient flight absolute pressure decreases the increase of the differential of the pressures across the supercharger will eventually cause the selecting means to move the other contact carried thereby into engagement with the other of the said spaced contacts. The control circuit thus energized causes the valve actuating means to move the valve to a position in which air is no longer passed through the turbine and the supercharger is relieved of the load imposed by the turbine. Thus the differential pressure capsule forms an overriding control which vetoes any action sought to be instituted by the temperature responsive device for cooled air when the supercharger differential pressure is greater than the predetermined one.

With the selecting means in this position the temperature responsive device is however operative to control the minimum temperature of the cabin. Should the cabin temperature reach some predetermined minimum temperature the temperature responsive device will energize a control circuit which causes the valve actuating means to move the valve to a position in which the supercharger air is passed through the heating device prior to its introduction into the cabin. The heating device is normally inactive but is made active by the movement of the valve to the position in which air is directed through the heating device. After the temperature of the air within the cabin has been raised by the heated air to the desired degree the temperature responsive device will operate to break the heat control circuit and the valve will be moved to a position in which the heating device is in effect bypassed.

To control the rate of air flow from the cabin supercharger, the present invention provides means for regulating the speed of the supercharger to maintain the rate of air flow substantially constant. When the air delivered by the supercharger is less than that required to maintain the desired air flow, the regulating means automatically increases the speed of the supercharger to increase the rate of air flow. This speed control means is operable, if the maximum speed possible is not sufficient to produce the required air flow, to actuate the valve operating means to move the valve to a position in which air is no longer directed through the turbine and a minimum load is imposed on the supercharger.

Other features and advantages of the present invention will be apparent from the following description taken in connection with the accompanying drawing in which the figure is a diagrammatical view of the control system of the present invention.

The control apparatus of the present invention, referring now to the drawing, is to be used in connection with a cabin 10 of any aircraft in which the cabin is adapted to be pressurized.

Air is directed into the cabin 10 through an air duct 11 arranged to deliver a flow of air under pressure from a supercharging blower 12. The supercharging blower 12 is supplied with air from a ram duct 13 and is driven through a shaft 14 of a prime mover including a variable speed drive diagrammatically illustrated at 15. To simplify the illustration of the now preferred embodiment of the invention, only one supercharging blower is shown although it is to be understood that any desired number of blowers operating in parallel could be used.

A check valve 16 is mounted within the duct 11 and is so formed that it is opened by the flow of air through the duct but will close and seal the duct to maintain cabin pressure in event of failure of air flow in the duct 11.

A discharge opening 17 is formed in the wall of the cabin 10 which is adapted to be closed or variably restricted by a suitable valve 18 controlled by some pressure responsive controlling system diagrammatically illustrated at 19. The discharge opening 17 is preferably located on the cabin wall in a region where the pressure along the wall is, due to surface air velocities, slightly less than that of the ambient atmosphere.

The inlet duct 11 is formed with a bifurcated delivery section adjacent the cabin end thereof, the branches 21 and 22 of which contain air cooling and heating means respectively. In the now preferred embodiment of the invention the air cooling means in the branch 21 comprise an intercooler 23 and an expansion turbine 24. The heating means in the branch 22 may comprise any type of heater 25 desired, although combustion heaters are presently preferred for heating air within an aircraft cabin.

A bypass duct 26 leads from the branch 21 intermediate the intercooler and the expansion turbine to a valve housing also open to the branches 21 and 22 of the delivery section of the inlet duct. The housing is formed with a discharge opening (not shown) but coaxially arranged in relation to a rotatably mounted valve 27. It will be seen that the valve 27 controls the flow of air through the branches 21 and 22 of the delivery duct as well as the bypass duct 26. The position of the valve is controlled by a motor 28 driving a worm gear 29 meshing with a gear 31 fixed to the shaft on which the valve 27 is mounted. The motor 28 is reversible and may be energized either through the field coil 32 or the field coil 33 by power from some suitable source such as the battery 34 to move the valve in alternate directions depending upon the direction of rotation of the motor.

To prohibit overtravel of the valve, limit switches 35 and 36 are adapted to be actuated by a cam 37 carried by a shaft driven through some suitable means such as the belt and pulley drive shown from the shaft carrying the gear 31. The cam 37 engages and opens the switch 35 to open the circuit of the field coil 33 and de-energize the motor when the valve reaches a position in which air is delivered into the interior of the cabin through branch 21, and the engagement of the cam with the switch 36 will open the circuit of the field coil 32 when the valve reaches the position in which air is passed through branch 22 into the interior of the cabin.

The energy developed by the turbine 24 can be used to drive a fan or the like located in the ram inlet of the inter-cooler to increase the flow of air through the inter-cooler.

Some direct manual control for the valve 27 such as a crank, although not shown, may be incorporated into the apparatus to permit operation of the valve if for some reason the electrical control circuits should fail.

Automatic control of valve 27 is effected through a control relay 38 which, as shown for illustrative purposes, is essentially a power amplifier in which very small currents from a battery 39 can be used to selectively energize the coils 41 and 42 of the relay 38 to control a flow of relatively large currents in the circuits of the motor field coils 32 and 33. A circuit lead 43 including relay coil 42 leads from the battery 39 to a contact 44 insulatedly carried by a bracket 45 on which is supported a bimetallic element 46. The free end of the bimetallic element 46 carries a contact 47 insulated from the element and movable by the same into engagement with the contact 44 upon the temperature of the air within the cabin reaching or exceeding some predetermined maximum temperature.

Contact 47 is electrically connected to a lead 48 which in turn is connected to a contact 49 carried within a sealed case 51. The case 51 is open to the pressure within the inlet duct 11 through a suitable conduit 52 containing, if desired, some suitable dust filter (not shown). An aneroid capsule 54 is fixed within the case 51 by a bracket shown here at 55. A second capsule 56 is supported by means of a bracket 57 to the opposite wall of the case. The interior of the capsule 56 is in communication through a conduit 58 within the ram duct 13 so that this capsule acts in response to the differential of the inlet duct pressure over the pressure within the ram inlet 13, that is, the differential of supercharger outlet pressure over supercharger inlet pressure.

The movable ends of the capsules 54 and 56 are pivotally connected by means of short links 59 and 60 respectively to a selective arm 61, the one end of which is pivotally mounted to the one wall of the case 51. A spring 62 normally tends to hold a contact 63 carried by the free end of the arm 61 in engagement with the contact 49. The spring is of such a size that it will hold the contact 63 in engagement with contact 49 as long as the differential pressure is below some predetermined value. The contact 63 is connected by a lead 64 to a contact 65 which is normally engaged by a spring pressed contact 66 grounded as shown at 67.

It should now be seen that when the temperature of the cabin is above a predetermined temperature and the differential pressure acting on the capsule 56 is low enough to cause the arm 61 to move the contact 63 into engagement with contact 49 a circuit will be established from the battery 39 through the relay coil 42, lead 43 to contact 44 in engagement with the contact 47 and thence through lead 48 to contact 49 engaged by contact 63 which, as previously explained, is connected to lead 64 grounded through engagement of contacts 65 and 66.

The energization of relay coil 42 causes the armature 68 of relay 38 to move to the right, as viewed in Figure 1, to engage the contact 69 against the action of one of a pair of centering springs 70 to complete a circuit from the battery 34 through the circuit of the field coil 33 to energize the motor to drive the valve 27 to a position in which air, before its entrance into the cabin, is passed through branch 21. As should be understood, the passage of the air through the inter-cooler 23 and expansion turbine 24 will greatly reduce the temperature of the same before the air is introduced into the cabin. The movement of valve 27 to this position will move the cam 37 into engagement with the switch 35 to de-energize the field coil 33 and consequently stop rotation of the motor 28 and the valve will remain in the position in which air is directed through the inter-cooler and turbine.

As the aircraft ascends, the load on the supercharger is gradually increased as the control 19 will progressively increase the cabin differential pressure. Although the position of the selecting arm 61 is actually controlled by the differential of supercharger outlet pressure over inlet pressure as previously explained, the increase of cabin differential pressure causes or produces a change in the supercharger differential pressure so that indirectly the arm 61 is controlled by cabin differential pressure.

Although the position of the arm 61 will be in most part controlled by the differential capsule 56 it must be remembered that the permissible limiting pressure differential on the supercharger will progressively decrease as the aircraft ascends to the end that the supercharger will not be capable of producing the same differential pressure at higher altitudes that it can at sea level. In order that the lower differential pressures allowable at higher altitudes will produce sufficient movement of the arm 61, the aneroid 54 is arranged to augment the force exerted by the differential pressure capsule 56 upon contraction of the latter at higher altitudes.

When flight conditions demand pressurization, the control 19 will move the valve 18 to close or restrict the openings 17, and as pressure builds up within the cabin the differential of supercharger outlet pressure over supercharger inlet pressure will also increase and result in a contraction of capsule 57 as well as expansion of the aneroid 54. When the differential supercharger pressure reaches some predetermined value the arm 61 will be moved upwardly as viewed in Figure 1 to separate contacts 63 and 49. The separation of the contacts 63 and 49, as should now be understood, will break the circuit normally controlled by contacts 44 and 47 so that even though the thermostat attempts to initiate a control calling for additional cool air, it will have no effect on the valve operating motor 28.

It will now be seen that the thermostat 46 will control the position of the valve 27 to regulate the flow of air through the intercooler and/or the turbine only as long as the arm 61 is held in a position in which the contact 63 is in engagement with the contact 49. Thus the capsules 54 and 56 and the arm 61 controlled thereby form an overriding or vetoing means for the thermostat 46 to prevent the thermostat from increasing the load of the turbine on the supercharger if the differential pressure of the latter is above the predetermined one.

As the load imposed by the turbine is not removed from the supercharger as soon as the differential pressure across the supercharger reaches the predetermined value the pressure should be of such a value that it will effect the overriding action before the pressurization requirements of the cabin are limited by the turbine load. In other words the turbine load as dictated by the thermostat should be limited to a value substantially equal to the difference between the maximum safe design load of the supercharger and the load imposed by the pressurization requirements of the cabin.

As the aircraft ascends, some preselected increase of the differential pressure above the predetermined one will cause the arm to move upwardly a distance sufficient to bring a contact 71 carried by the arm 61 into engagement with a second contact 72 carried by the casing 51. The engagement of contacts 71 and 72 completes a circuit through the relay coil 41 from the battery 39, lead 73, connected between the coil 41 and the contact 72 and including a switch 74 closed when the valve 27 is in the position in which air is directed through the turbine, engaged contacts 72 and 71 and thence to ground through the ground lead 75.

The completion of the above traced circuit draws the armature 68 of the relay to the left as viewed in the figure and into engagement with the contact 76 to energize field coil 32 of the motor which, as should now be understood, results in movement of the valve 27 in a clockwise direction. The motor will continue to drive the valve as well as the cam 37 until the leading edge of the latter moves into engagement with the movable element of the switch 74 to open the same. This, as should be understood, results in de-energization of the relay coil 41 whereupon the spring 70 returns the armature 68 to its normal position and the motor is consequently rendered inoperative. The valve 27 is thus retained in the position it occupied when the cam 37 opened the switch 74. The switch 74 is so mounted in the path of movement of the cam 37 that the latter opens the switch when the valve 27 moves into a position in which the branches 21 and 22 of the inlet duct are closed by the valve and all air delivered by the supercharger is directed through the bypass duct 26.

The bimetallic element 46 is so formed as to be very sensitive to changes in the temperature of the air within the cabin so that if the temperature of the air is reduced below some predetermined minimum temperature the bimetallic element 46 will move upwardly to bring a contact 77, grounded through lead 78, into engagement with a contact 79 connected by a lead 81 to the lead 73 which as previously explained is connected to the battery 39 through the relay coil 41. This movement of the bimetallic element energizes a circuit from the battery 39 through the relay coil 41, lead 73, contacts 79 and 77 to the grounding lead 78. Energization of the relay coil 41 as will now be understood causes the armature 68 of the relay 38 to move into engagement with the contact 76 to energize the circuit of the field coil 32. Energization of this field coil again causes the motor 28 to drive the valve 27 in a clockwise direction until either the air within the cabin reaches such a temperature that the bimetallic element 46 moves downwardly to separate the contacts 77 and 79 or the cam 37 moves into engagement with and opens the limit switch 36. If the latter is the case, all air delivered by the supercharging blower will be directed through the branch 22 to the end that the air will be heated prior to its entrance into the cabin. It should be understood, however, that as the bimetallic element 46 is very sensitive the circuit energizing the relay coil 41 might be broken by separation of contacts 77 and 79 at some point between the alternate positions of the valve 27 as determined by the limit switches 35 and 36.

If the temperature of the air within the cabin should again exceed the predetermined maximum temperature, the bi-metallic element 46 will move downwardly as viewed in Figure 1 to bring contact 47 into engagement with contact 44, but only if the contact 63 is in engagement with contact 49, to again establish the circuit through the relay coil 42 to the end that the motor will be so energized as to drive the valve 27 to a position in which the air will be passed through the intercooler and/or turbine prior to its introduction into the cabin.

To control the rate of air flow from the supercharger, means are provided for automatically regulating the speed of the superchager to maintain the rate of air flow substantially constant. In the preferred embodiment of the present invention this means comprises a chamber 83 containing a transversely mounted diaphragm 84. The diaphragm forms a flexible dividing wall intermediate the ends of the chamber 83 to form therein a pair of compartments. The one compartment is connected through a duct 85 to the throat of a venturi 86 formed in the inlet duct 11 while the other compartment is connected by a duct 87 to the inlet duct 11 upstream from the venturi 86. It will thus be seen that if the velocity of the air in the duct 11 should increase above some predetermined velocity, the decrease in the pressure of the air in the throat of the venturi will cause the diaphragm 84 to be urged to the left as viewed in Figure 1 to correspondingly move the rod 88 connected to the variable speed mechanism 15 through some suitable linkage 89. This movement of the rod 88 through adjustment of the variable speed mechanism 15 decreases the speed of the supercharger and thus reduces the rate of air flow in the duct 11.

Should the rate of flow decrease, the diaphragm will be moved to the right to move the rod to the right and actuate the mechanism 15 to increase the speed of the supercharger. If the maximum speed possible does not produce the amount of flow desired, movement of the rod 88 a predetermined distance will urge the arm carrying the contact 66 to the right and separate contacts 65 and 66 and thus de-energize the relay coil 42. This movement of the rod 88 will also move a contact 91 into engagement with a contact 92 to ground a circuit which includes a lead 93 connected to lead 73, the latter, and the relay coil 41. The energization of the relay coil 41 again draws armature 68 of the relay 38 to the left as viewed in Figure 1 and thus establishes a circuit from the battery 34 to armature 68 and contact 76 to energize the circuit of field coil 32 to the end that the motor 28 drives the valve 27 to stop further passage of air through the turbine 24.

The valve will be driven by the motor until the flow condition causes the diaphragm 84 to return the rod 88 against the action of the spring 94 to its normal position and separates contacts 91 and 92 or until the cam 37 is moved into engagement with the movable element of the switch 74 to open this switch and break the circuit through the lead 73. The cam, as previously pointed out, is so associated with the valve 27 that this switch will be opened by the cam when the valve 27 reaches a position in which air is allowed to pass through the bypass duct 26. Thus the turbine 24 will be taken out of the path of the supercharger air should transient changes in the duct 11 bring about the conditions just described.

If the pressure of the air within the throat of the venturi does return to the normal pressure expected, diaphragm 84 will move back to its neutral position within the chamber 83 and the spring 95 will again hold the contact 66 in engagement with the contact 65 and thus reestablish the circuit controlled by the thermostat 46.

As soon as the differential pressure across the supercharger reaches such a value as to cause the arm 61 to move the contact 71 into engagement with contact 72 the thermostat 46 is operable to control the minimum temperature of the air within the cabin. If the arm 61 has been moved upwardly to bring the contacts 71 and 72 into engagement, the supercharger differential pressure has been increased due to the fact that the air delivered by the supercharger is now being used to pressurize the cabin. In ordinary flight operations this will not occur until the aircraft has attained some altitude at which the ambient air temperature is relatively low and it should be necessary to heat the air prior to its delivery to the cabin. It will be seen that when the temperature of the air within the cabin reaches the predetermined minimum value, the thermostat will move the contact 77 into engagement with the contact 79 to establish a circuit from the battery 39 through relay coil 41, lead 73, lead 81, contacts 79 and 77 to the grounding lead 78. Energization of relay coil 41, as previously explained, results in energization of field coil 32 of the motor 28 to cause the motor to drive the valve 27 in a clockwise direction. Although the cam 37 will open the switch 74 as the valve is driven by the motor, the opening of this switch will have no effect on the circuit now completed through the relay coil 41 and the valve will continue to be driven until the cam 37 moves into engagement with and opens the limit switch 36. When the switch 36 is open the circuit through the field coil 32 will be broken and motion of the valve will cease. With the valve in the position determined by the limit switch 36 all air delivered by the supercharger will now be directed down through the branch 22 and the heater 25 mounted therein.

In the embodiment of the invention now preferred the heater 25 will only be operated when all air is being directed through the branch 22, and to effect automatic control of the heater 25 a heater circuit 96 is provided to control the operation of the heater 25. The circuit 96 is provided with a switch 97 which controls the flow of current from battery 98 through the circuit 96 and a heater control 99 as long as the limit switch 36 is closed. It will be seen, referring to the figure of the drawing, that when the limit switch 36 is opened by movement of the cam 37 into engagement therewith the switch 97 is closed to establish a circuit from the battery 98 through the control circuit 96, heater control 99 to the ground 101. When the switch 97 is closed, the heater 25 will be operated to the end that the air will be heated prior to its introduction into the cabin 10.

If the temperature of the air delivered to the cabin should raise the temperature of the air within the cabin above the predetermined minimum temperature, the thermostat 46 will separate the contacts 77 and 79 to de-energize the circuit through the relay coil 41 to allow the armature 68 to be returned to its normal position. A circuit including a normally open, grounded switch 102, closed by opening movement of the switch 74, and a lead 103 connected to the lead 48 will be completed when the temperature of the air within the cabin reaches the predetermined maximum value. This circuit, as should now be understood, will be energized when the temperature of the air within the cabin causes the thermostat to move contacts 44 and 47 into engagement. This results in energization of the relay coil 42 and the resultant movement of the armature 68 energizes the motor 28 to drive the valve 27 in a counter-clockwise direction to close the switch 36 and open the switch 97 which, as should be understood, will result in de-energization of the heater control 99 and render the heater inoperative. The motor will continue to drive the valve in a counter-clockwise direction until either the switch 102 is opened by the cam 37 or the temperature of the cabin air reaches a temperature below that temperature at which the thermostat 46 causes engagement of the contacts 44 and 47.

It should now be understood that the present invention provides a control system for regulating the temperature of the air within the cabin by passing air supplied to the cabin for ventilation and pressurization through a turbine and yet limits the summation of the loading on the supercharger from the refrigeration turbine and the requirement of cabin pressurization whereby the refrigeration turbine load as dictated by the thermostat is limited to a value substantially equal to the difference between the maximum safe design load of the supercharger and the load imposed by the pressurization requirements of the cabin.

Although the now preferred embodiment of the present invention has been shown and described herein it is to be understood that the invention is not to be limited thereto for it is susceptible to changes in form and detail within the scope of the appended claims.

I claim:

1. In an aircraft having a cabin provided with an outlet valve and pressure responsive control means for varying the flow of air through said valve to regulate the pressure within the cabin: an air compressor, a discharge conduit system leading from said compressor to the cabin; an expansion turbine in said conduit system; temperature responsive means within said cabin for progressively loading said turbine upon said air compressor in response to increases in the temperature of cabin air; and pressure responsive means for limiting the load on said air compressor from said turbine as dictated by said temperature responsive means to a value substantially equal to the difference between the maximum safe design load of said air compressor and the load imposed on said air compressor by cabin pressurization.

2. In an aircraft having a cabin adapted to be pressurized: air delivery means for supplying air under pressure to said cabin; an expansion turbine between said air delivery means and said cabin; valve means for controlling the flow of air from said air delivery means through said turbine; means responsive to the temperature of the air within said cabin for controlling said valve means so organized and arranged that said valve means is operated to increase the flow of air through said turbine as the temperature of the air within said cabin exceeds a predetermined temperature; and means for overriding said temperature responsive means upon the differential of the outlet pressure over inlet pressure of said air delivery means exceeding a predetermined pressure value to prevent the air delivery means from being overloaded.

3. In an aircraft having a cabin adapted to be pressurized: means for delivering air to said cabin including an inlet duct; an outlet duct; valve means for controlling the flow of air through said outlet duct; air cooling means located in said inlet duct; valve means for controlling the flow through said cooling means; means for operating said last named valve means; means responsive to the temperature of the air within said cabin for actuating said valve operating means; and means responsive to a predetermined differential of the outlet pressure of said air delivering means over the inlet pressure of the same for rendering said temperature responsive means inoperative to actuate said valve operating means.

4. In an aircraft having a cabin adapted to be pressurized: means for delivering air to said cabin including an inlet duct; an outlet duct; valve means for controlling the flow of air through said outlet duct; air cooling means located in said inlet duct; valve means for controlling the flow through said cooling means; means for operating said last named valve means; means responsive to the temperature of the air within said cabin for actuating said valve operating means; means responsive to a predetermined differential of supercharger inlet pressure over supercharger outlet pressure for rendering said temperature responsive means inoperative to actuate said valve operating means; and means made operative by a predetermined increase of the said differential for actuating said valve operating means to reduce the flow of air through said air cooling means.

5. In an aircraft having a cabin adapted to be pressurized: means including an inlet duct for delivering air to said cabin; an outlet duct; valve means for controlling the flow of air through said outlet duct; air cooling means located in said inlet duct; a bypass duct around said air cooling means; valve means for controlling the flow through said bypass duct; means for operating said last named valve means; means responsive to the temperature of the air within said cabin for actuating said valve operating means whereby varying amounts of air are directed through said air cooling means depending upon the temperature of the air within said cabin; and means responsive to a predetermined differential of cabin pressure over ambient pressure for rendering said temperature responsive means inoperative to actuate said valve operating means.

6. In an aircraft having a cabin adapted to be pressurized: air delivery means for supplying air under pressure to said cabin; a duct leading from said delivery means to a bifurcated inlet duct supplying air to said cabin; air cooling means located in one branch of said bifurcated inlet duct; valve means for controlling the flow of air from said air delivery means through said bifurcated inlet duct; means responsive to the temperature of the air within said cabin for controlling said valve means so organized and arranged that said valve means is operated to increase the flow of air through the branch of said inlet duct containing said cooling means as the temperature of the air within said cabin exceeds a predetermined temperature; and means for overriding said temperature responsive means upon the differential pressure of said air delivery means exceeding a predetermined pressure value and operating said valve means to direct air through the other branch of said inlet duct.

7. In a pressure system for an aircraft the combination of: an air compressor; an intake to the compressor from the ambient atmosphere; a discharge conduit system leading from the compressor to the ambient atmosphere including an inlet air duct to the cabin of the aircraft and an outlet duct from the cabin to the ambient atmosphere; an expansion turbine in said inlet duct; a bypass duct leading from said inlet duct upstream from said turbine to a point in said inlet duct down-stream from said turbine; valve means for controlling the flow of air to said bypass duct whereby varying amounts of air may be passed through said turbine to cool the same; means for operating said valve means; means responsive to the temperature of the air within said cabin for actuating said valve operating means whereby varying amounts of air are passed through said turbine and the bypass duct depending upon the temperature of the cabin air; and means made operative by the cabin pressure reaching a predetermined differential over ambient flight pressure for rendering said temperature responsive means inoperative to actuate said valve operating means.

8. In an aircraft having a cabin adapted to be pressurized: air delivery means for supplying air under pressure to said cabin; air cooling means between said air delivery means and said cabin; valve means for controlling the flow of air from said air delivery means through said cooling means; means responsive to the temperature of the air within said cabin for controlling said valve means so organized and arranged that said valve means is operated to increase the flow of air through said cooling means as the temperature of the air within said cabin exceeds a predetermined temperature; means for overriding said temperature responsive means upon the air delivery means differential pressure exceeding a predetermined value to thereafter prevent said valve means from being operated to increase the flow of air through said air cooling means; and means made operative by a predetermined increase of said differential pressure over said predetermined value for operating said valve means to reduce the flow of air through said cooling means.

9. In an aircraft having a cabin adapted to be pressurized: an air compressor; a duct leading from said compressor, said duct being formed with a plurality of branches leading to said cabin; an expansion turbine in one of said branches; a normally inoperative heating means in another of said branches; a valve for selectively directing air through said branches; temperature responsive means for actuating said valve to direct air through one or the other of said branches depending upon the temperature of the air within the cabin; and means for rendering said heating means operative upon movement of said valve to a position in which air is directed through the branch containing said heating means.

10. In an aircraft having a cabin adapted to be pressurized: an air compressor; a duct leading from said compressor, said duct being formed with a plurality of branches leading to said cabin; an expansion turbine in one of said branches; a normally inoperative heating means in another of said branches; a valve for selectively directing air through said branches; valve actuating means; temperature responsive means for operating said valve actuating means to move said valve so as to direct air through one or the other of said branches depending upon the temperature of the air within the cabin; and means for rendering said heating means operative upon movement of said valve to a position in which air is directed through the branch containing said reheating means, said last named means comprising a control circuit including a normally open switch closed upon movement of said valve to the position in which air is directed through the branch containing said heating means.

11. In an aircraft having a cabin adapted to be pressurized: air delivery means for supplying air under pressure to said cabin; an inlet duct leading from said air delivery means to said cabin; air cooling means in said duct; valve means for controlling the flow of air from said air delivery means through said cooling means; means responsive to the temperature of the air within said cabin for controlling said valve means so organized and arranged that said valve means is operated to increase the flow of air through said cooling means as the temperature of the air within said cabin exceeds a predetermined temperature; means responsive to the velocity of the air in said inlet duct for rendering said temperature responsive means inoperative to control said valve means upon the velocity of the air decreasing below some preselected velocity, said last named means adapted when operative to actuate said valve means to decrease the flow of air through said cooling means; and means for overriding said temperature responsive means upon the differential pressure of air delivery means exceeding a predetermined value to prevent the air delivery means from being overloaded.

12. A system for regulating the temperature of the air within an aircraft cabin adapted to be pressurized comprising: an air compressor for delivering air under pressure to said cabin; air cooling means; air heating means; valve means movable between alternate positions for selectively directing air from said compressor through said cooling or heating means, said cooling means being so organized and arranged that the load imposed thereby on said compressor is less than the maximum load capacity of said compressor; temperature responsive means for actuating said valve means and operative to move said valve in response to changes in the temperature of the air within the cabin; an outlet valve for discharging vitiated air from said cabin; regulatory means for controlling said discharge valve to regulate the pressure within said cabin; and means responsive to a predetermined load on said compressor derived from said cooling means and the increase of cabin differential pressure as said regulatory means closes said discharge valve during ascent of said aircraft for overriding said temperature responsive means and operable to actuate said valve means to remove the load on said compressor imposed by said cooling means.

13. A system for regulating the temperature of the air within an aircraft cabin adapted to be pressurized comprising: an air compressor for delivering air under pressure to said cabin; an outlet valve for discharging vitiated air from said cabin; regulatory means for controlling said discharge valve to regulate the pressure within said cabin; air cooling means; air heating means; valve means movable between alternate positions for selectively directing air from said compressor through said cooling or heating means, said cooling means being so organized and arranged that the load imposed thereby on said compressor is less than the maximum load capacity of said compressor; temperature responsive means for actuating said valve means and operative to move said valve in response to changes in the temperature of the air within the cabin; and means responsive to a predetermined increase of the load on said compressor caused by said regulatory means closing said discharge valve to increase the cabin differential pressure for overriding said temperature responsive means and operable to actuate said valve means to remove the load on said compressor imposed by said cooling means.

14. In an aircraft having a cabin adapted to be pressurized: air delivery means for supplying air under pressure to said cabin; an expansion turbine between said air delivery means and said cabin; valve means for controlling the flow of air from said air delivery means through said turbine; means responsive to the temperature of the air within said cabin for controlling said valve means so organized and arranged that said valve means is operated to increase the flow of air through said turbine as the temperature of the air within said cabin exceeds a predetermined temperature; a controllable outlet valve for discharging vitiated air from said cabin; means for regulating said outlet valve to control the cabin differential pressure by opening or closing said outlet valve; and means for overriding said temperature responsive means upon the differential of the outlet pressure over inlet pressure of said air delivery means exceeding a predetermined pressure value to limit the load on said air delivery means from said turbine to a value substantially equal to the difference between the maximum safe design load of said air delivery means and the load imposed on the latter by the increase of cabin differential pressure upon closing of said outlet valve by said regulating means.

15. In an aircraft having a cabin adapted to be pressurized: air delivery means for supplying air under pressure to said cabin; a duct leading from said delivery means to a bifurcated inlet duct supplying air to said cabin; a heat interchanger located in one branch of said inlet duct; air cooling means located in said branch of the inlet duct downstream from said interchanger; air heating means located in the other of said branches; a bypass duct around said air cooling means; valve means for controlling the flow of air from said air delivery means through said branches and said bypass duct; means responsive to the temperature of the air within said cabin for controlling said valve means so organized and arranged that said valve means is operated to increase the flow of air through the branch of said inlet duct containing said cooling means as the temperature of the air within said cabin exceeds a predetermined temperature; means for inhibiting control of said valve means by said temperature responsive means upon the air delivery means differential pressure exceeding a predetermined pressure value; and means for operating said valve means to direct air through the other branch of said inlet duct, said means made operative upon the air delivery means differential pressure reaching a predetermined value in excess of said first named predetermined value.

16. In an aircraft having a cabin adapted to be pressurized: air compressing means; an inlet duct leading from said air compressing means and including a bifurcated portion communicating directly with said cabin; an outlet duct; valve means for controlling the flow of air from said cabin through said outlet duct; air cooling means located in one branch of said inlet duct; a bypass duct leading around said cooling means; air heating means located in the other branch of said inlet duct; valve means for controlling the flow of air through said branches and the bypass duct; means for operating said last named valve means; means responsive to the temperature of the air within said cabin for actuating said valve operating means whereby varying amounts of air are passed through said cooling means and the bypass duct depending upon the temperature of the cabin air; means responsive to a predetermined differential of the outlet pressure of said air compressing means over the inlet pressure of the same for rendering said temperature responsive means inoperative to actuate said valve operating means; and means made operative by an increase of the said differential pressure above said predetermined differential for actuating said valve operating means to stop the flow of air through said air cooling means and direct the same through the branch containing said heating means.

17. In an aircraft having a cabin provided with an outlet valve and pressure responsive control means for varying the flow of air through said valve to regulate the pressure within the cabin: an air compressor; a duct leading from said air compressor, said duct being formed with a pair of branches leading to said cabin; a valve for controlling the flow of air through said branches; an expansion turbine in one of said branches; a bypass leading from said last named branch upstream from said turbine to said valve; a heating means in the other of said branches; valve actuating means; temperature responsive means for operating said actuating means to move said valve to a position in which air is directed through said turbine when the temperature of the air within said cabin reaches a predetermined maximum temperature; means for overriding said temperature responsive means when the differential pressure of said air compressor reaches a predetermined value, said overriding means operating said actuating means upon a predetermined increase of said differential pressure above said value to move said valve to a position wherein air is directed through said bypass; and temperature responsive means operative when the cabin air reaches a predetermined minimum temperature to operate said actuating means to move said valve to a position in which air is directed through the branch in which said heating means is located.

18. In an aircraft having a cabin provided with an outlet valve and pressure responsive control means for varying the flow of air through said valve to regulate the pressure within the cabin: an air compressor; a duct leading from said air compressor, said duct being formed with a pair of branches leading to said cabin; a valve for controlling the flow of air through said branches; an expansion turbine in one of said branches; a bypass leading from said last named branch upstream from said turbine to said valve; a normally inoperative heating means in the other of said branches; valve actuating means; temperature responsive means for operating said actuating means to move said valve to a position in which air is directed through said turbine when the temperature of the air within said cabin reaches a predetermined maximum temperature; means for overriding said temperature responsive means when the differential pressure of said air compressor reaches a predetermined value, said overriding means operating said actuating means upon a predetermined increase of said differential pressure above said value to move said valve to a position wherein air is directed through said bypass; temperature responsive means operative when the cabin air reaches a predetermined minimum temperature to operate said actuating means to move said valve to a position in which air is directed through the branch in which said heating means is located; and means for rendering said heating means operative upon movement of said valve to a position in which air is directed through the branch containing said heating means.

BRUCE E. DEL MAR.

REFERENCES CITED

The following references are of record in the file of this patent:

UNITED STATES PATENTS

| Number | Name | Date |
| --- | --- | --- |
| 2,119,402 | Puffer | May 31, 1938 |
| 2,327,737 | Pendergast | Aug. 24, 1943 |
| 2,401,861 | Cunningham | June 11, 1946 |
| 2,408,699 | Sparrow | Oct. 1, 1946 |
| 2,412,110 | Williams | Dec. 3, 1946 |